US 6,615,330 B2

(12) United States Patent
Debiez et al.

(10) Patent No.: US 6,615,330 B2
(45) Date of Patent: Sep. 2, 2003

(54) VIRTUAL WORM METHOD AND SYSTEM

(75) Inventors: Jacques Debiez, Cugnaux (FR); James P. Hughes, Lino Lakes, MN (US); Axelle Apvrille, Toulouse (FR)

(73) Assignee: Storage Technology Corporation, Louisville, CO (US)

( * ) Notice: Subject to any disclaimer, the term of this patent is extended or adjusted under 35 U.S.C. 154(b) by 82 days.

(21) Appl. No.: 10/034,055

(22) Filed: Dec. 27, 2001

(65) Prior Publication Data

US 2003/0126359 A1 Jul. 3, 2003

(51) Int. Cl.[7] ................... G06F 12/08; G06F 12/14
(52) U.S. Cl. ................... 711/163; 711/152; 365/195
(58) Field of Search ................. 711/163, 152; 365/195

(56) References Cited

U.S. PATENT DOCUMENTS 6,330,648 B1 * 12/2001 Wambach et al. .......... 711/163

* cited by examiner

*Primary Examiner*—Reginald G. Bragdon
*Assistant Examiner*—Midys Inoa
(74) *Attorney, Agent, or Firm*—Brooks & Kushman P.C.

(57) ABSTRACT

A system and method of storing data using write once read many (WORM) protection including using a hardware storage device to write data to a medium are provided. The method further includes establishing a write once read many (WORM) module external to the hardware storage device. Data blocks are received at the module, block numbers are specified with the module, and data is output from the module to write to the storage medium at specified block numbers. The last specified block number or all specified block numbers depending on the type of media access are stored so that the external WORM module prevents future writing of data to these specified or already used block numbers.

17 Claims, 2 Drawing Sheets

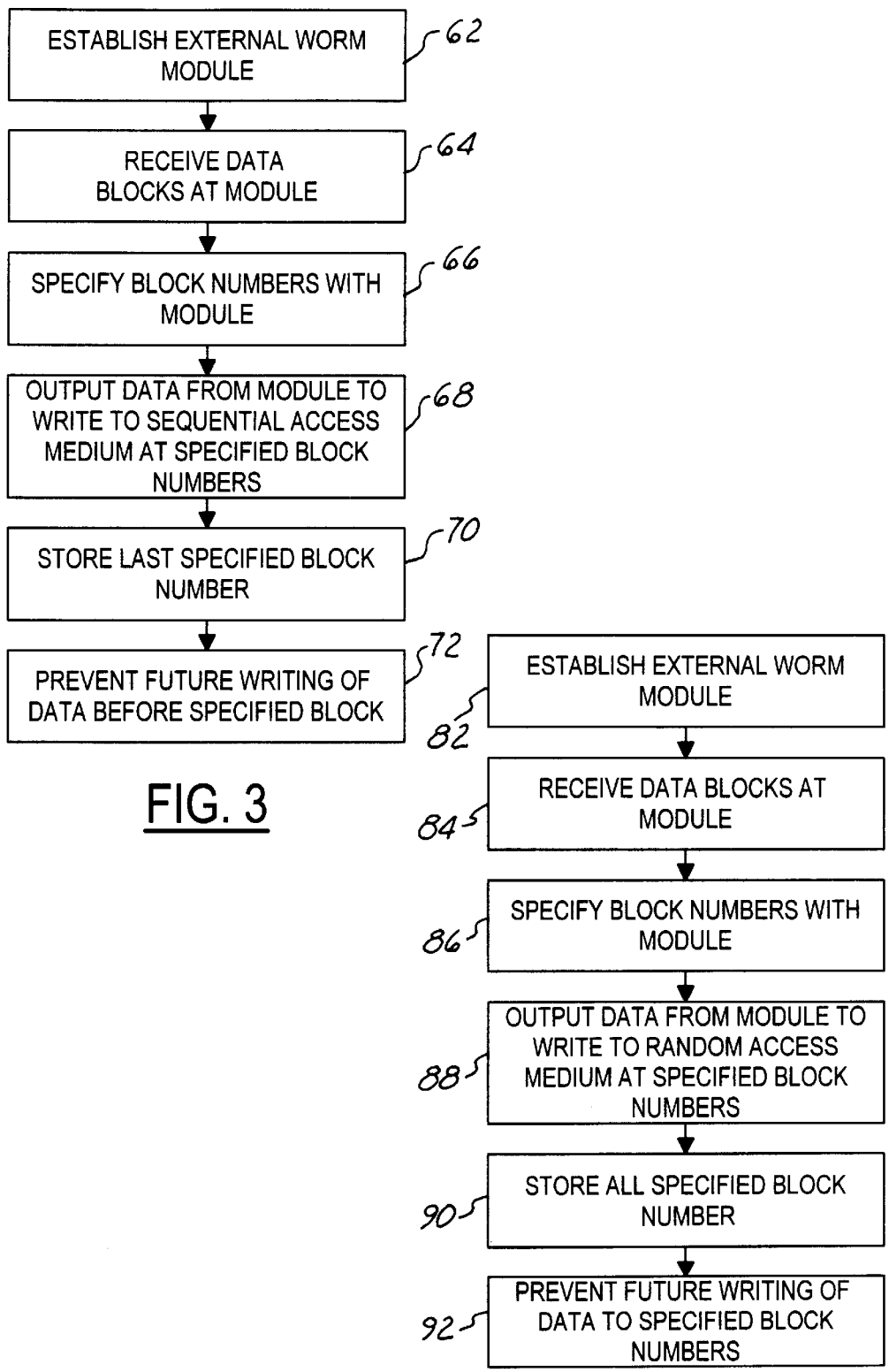

VIRTUAL WORM METHOD AND SYSTEM

BACKGROUND OF THE INVENTION

1. Field of the Invention

The present invention relates to a method and system for storing data using write once read many (WORM) protection including using a hardware storage device to write data to a medium wherein data is organized on the medium by block numbers, and wherein data may be written once to the medium, read many times from the medium, but not erased, modified, or overwritten.

2. Background Art

Write once read many (WORM) is a data storage technology that allows information to be written to a medium a single time and prevents the data storage device from erasing, modifying, or overwriting the data. That is, WORM describes media on which data can be written only once, data can never be overwritten, and data is intended to be read back many times. Traditionally, WORM is supported by the media itself, giving an advantage to some optical media that are physically write once, and preventing magnetic media from being used to implement WORM functionality.

WORM protection refers to the protection that prevents the user from erasing, modifying, or overwriting data on the WORM media. Optical media that is physically write once has inherent WORM protection. WORM protection also exists on VOLSAFE cartridges that are commercially available from Storage Technology Corporation, Louisville, Colo. The VOLSAFE tape cartridges have a physical/mechanical lock that prevents data overwriting when associated with a compatible drive. More specifically, the presence of the physical lock on the VOLSAFE tape is detected by specific VOLSAFE supporting drives. When the physical lock is detected, the drives prevent data overwriting. As such, VOLSAFE cartridges and compatible drives make it possible to implement WORM functionality with magnetic media.

Although WORM protection implementations that use magnetic media have been used in some applications that have been commercially successful, it is possible to counter the physical/mechanical lock. For example, physically damaging the lock or inserting the tape cartridge into a drive that does not recognize the lock could make it possible to overwrite or modify the data, overcoming the WORM protection.

For the foregoing reasons, there is a need for WORM protection of data that does not depend on a physical/mechanical lock and a compatible drive.

SUMMARY OF THE INVENTION

It is therefore an object of the present invention to provide a method and system for storing data using write once read many (WORM) protection that utilizes a WORM module external to the hardware storage device, allowing direct protection of the data itself without requiring the physical/mechanical lock and compatible drive.

In carrying out the above object, a method of storing data using write once read many (WORM) protection including using a hardware storage device to write data to a medium is provided. The data is organized on the medium by block numbers. The method further comprises establishing a write once read many (WORM) module external to the hardware storage device. A data block is received as an input to the module. A block number is specified with the module. The data block is output from the module such that the data block is written to the medium at the specified block number. The method further comprises storing the specified block number such that the specified block number is accessible to the module, and preventing future writing of data to the specified block number.

In the present invention, the write once read many (WORM) module is external to the hardware storage device. The external WORM module allows WORM protection of data by directly protecting the data itself, without depending on a physical/mechanical lock and compatible drive. The external WORM module is independent of any tape drive or cartridge, and may be implemented in software, hardware, or a combination of software and hardware. In one embodiment, the write once read many (WORM) module is established as a hardware module external to the hardware storage device. In another embodiment, the write once read many (WORM) module is established as a software module external to the hardware storage device. The software module may be implemented in a variety of ways including as part of an application programming interface (API).

Embodiments of the present invention may be implemented with different types of storage media. In one example, the storage medium is a sequential access medium. A plurality of data block is received, a plurality of block numbers is specified, and the plurality of data blocks is output such that the plurality of data blocks is written to the medium at the plurality of specified block numbers. A last specified block number of the plurality of specified block numbers is stored such that the last specified block number is accessible to the module. The module may prevent future writing of data to the plurality of specified block numbers. That is, whenever a data block is processed in the WORM module, its block number is memorized. As such, it is never possible to overwrite that block number. For sequential access storage media such as tape, because of the sequential nature of the media, only the last data block written is stored for each volume.

In another example, the storage medium is a random access medium. The plurality of specified block numbers is stored such that the plurality of specified block numbers is accessible to the module so that the module may prevent future writing of data to the plurality of specified block numbers. That is, for media that is not sequential in nature, instead of memorizing only the last data block written, all data blocks written are memorized to prevent overwriting of those block numbers.

Further, in carrying out the present invention, a system for storing data using write once read many (WORM) protection comprises a write once read many (WORM) module external to the hardware storage device. The module is programmed to receive a data block as an input to the module, specify a block number with the module, output the data block from the module such that the data block is written to the medium at the specified block number, and store the specified block number such that the specified block number is accessible to the module. The module is further programmed to prevent future writing of data to the specified block number.

The system or module may be implemented as a hardware module external to the hardware storage device or as a software module external to the hardware storage device. The software module may be implemented, for example, as part of an application programming interface (API). In addition, embodiments of the system module may be programmed for use with a sequential access medium or a random access medium so that either the last specified block number or all block numbers are memorized, as appropriate, to prevent future writing of data to previously specified and used block numbers.

Still further, in carrying out the present invention, a system for storing data using write once read many (WORM) protection is provided in combination with media including a redundant array of inexpensive tapes (RAIT). The system comprises a write once read many (WORM) module external to the hardware storage device. The module is programmed to receive a data block as an input to the module, specify a block number with the module, and output the data block from the module such that the data block is written to the media at the specified block number. The WORM module is further programmed to store the specified block number such that the specified block number is accessible to the module, and prevent future writing of data to the specified block number.

Again, the WORM module may be implemented as either a hardware module or a software module external to the hardware storage device. In addition, the software module may be implemented as, for example, part of an application programming interface (API). Because the redundant array of inexpensive tapes (RAIT) functions as a sequential access medium, the preferred implementations of the combination store a last specified block number for writing such that the last specified block number is accessible to the module so that the module may prevent future writing of data to the plurality of the specified block numbers. That is, the last block number is memorized so that it is never possible to overwrite before that block number.

The advantages associated with embodiments of the present invention are numerous. For example, methods and systems of the present invention provide WORM equipment that is independent of the storage device and storage media by implementing a WORM module as an external hardware or software module. In addition, various forms of data integrity detection techniques may be used to enforce the security of the WORM module.

The above object and other objects, features, and advantages of the present invention are readily apparent from the following detailed description of the preferred embodiment when taken in connection with the accompanying drawings.

BRIEF DESCRIPTION OF THE DRAWINGS

FIG. 3 is a block diagram illustrating a method of the present invention for a sequential access medium;

FIG. 4 is a block diagram illustrating a method of the present invention for a random access medium.

DETAILED DESCRIPTION OF THE PREFERRED EMBODIMENTS

Figure 1:
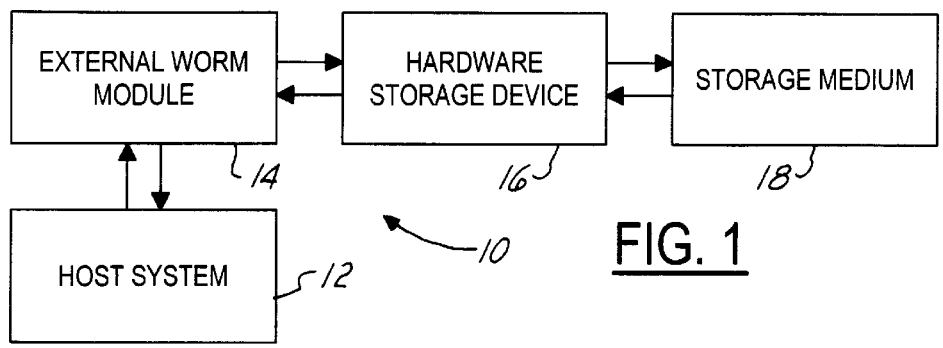
FIG. 1 is a system of the present invention for storing data using WORM protection.

Embodiments of the present invention provide WORM equipment that is storage device and storage medium independent. The WORM protection or overwriting prevention is implemented as an external WORM module that may be an external hardware module or an external software module. It is appreciated that WORM protection, as implemented in the embodiments of the present invention, functions as a virtual WORM in that the WORM protection does not rely on the hardware and media. In FIG. 1, a system for storing data is generally indicated at 10. System 10 includes a host system 12 and an external WORM module 14. External WORM module 14 receives a data block as an input to the module, and specifies a block number. A data block is output from module 14 such that the data block is written by hardware storage device 16 to storage medium 18 at the specified block number. The data block is a chunk of data that is being processed all at once. External WORM module 14 stores the specified block number such that the specified block number is accessible to the module. That is, the specified block number may be stored at or may be stored external to module 14. Storing the specified block number allows external WORM module 14 to prevent a future writing of data to the specified block number. More specifically, in embodiments of the present invention, the overwriting prevention feature or WORM protection is handled in the external WORM module itself.

Data written on storage medium 18 is cut into pieces or data blocks. Data blocks generally have a fixed size and are the smallest unitary piece of information that a storage device can write on the storage media. Whenever a data block is processed in the WORM module, its block number is memorized so that it is never possible to overwrite that block number, that is, to provide WORM protection. For a sequential access medium, a last specified block number may be stored or memorized to prevent future writing of data to already used blocks. For a random access medium, all specified block numbers are stored to prevent writing of data to previously used block numbers. That is, the external WORM module keeps track of block numbers as block numbers are specified for writing data to them. The WORM module makes sure that once any particular block number has been written to, that the future writing of data to that particular block number is prevented. For sequential media such as tapes, only the last data block written is stored for each volume because the access to the medium is sequential. Alternatively, embodiments of the present invention may be implemented for random access type media by memorizing all block numbers. It is necessary to memorize all block numbers because access to the medium is not restricted to sequential access.

It is appreciated that in addition to the WORM protection features of the present invention, preferred embodiments use data integrity detection techniques to enforce security of the WORM module. For example, data integrity information may be appended to the data and written to the media. Data integrity information may take any form.

Figure 2:
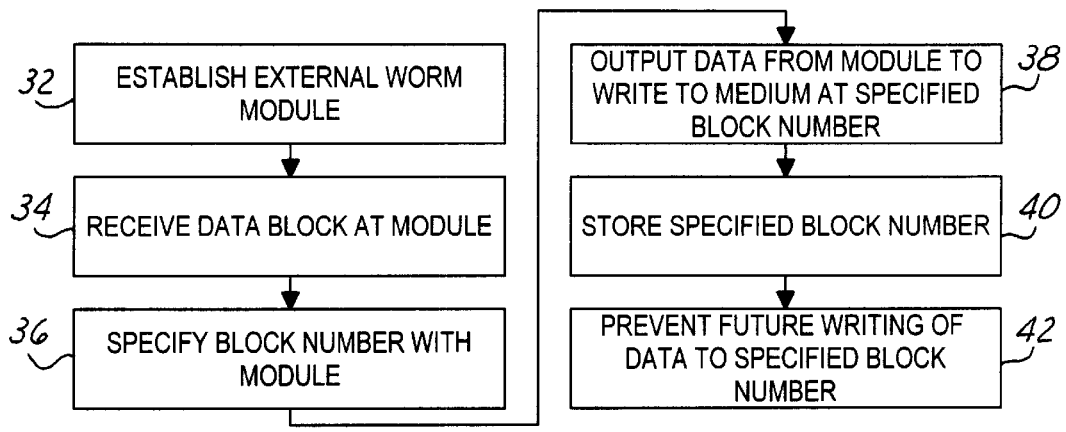
FIG. 2 is a block diagram illustrating a method of storing data using WORM protection in accordance with the present invention.

FIG. 2 illustrates a method of storing data of the present invention. At block 32, an external WORM module is established. The external WORM module may be a hardware module external to the hardware storage device or may be a software module external to the storage device. A suitable hardware module is a physical device that sits inline just before the physical storage device. In addition, a suitable software module could be implemented as part of an application programming interface (API). That is, an API could be created that only allows read and append commands.

At block 34, a data block is received as an input to the module. At block 36, a block number is specified with the module. At block 38, the data block is output from the module such that the data block is written to the medium at the specified block number. At block 40, the specified block number is stored such that the specified block number is accessible to the module. Further, at block 42, future writing of data to the specified block number is prevented. Advantageously, embodiments of the present invention implement WORM protection in an external WORM module overcoming the dependency of prior art WORM protection on the use of a physical/mechanical lock and associated compatible drive. That is, embodiments of the present invention provide virtual WORM protection. Previous WORM implementations have had specific hardware requirements. Embodiments of the present invention contemplate an external WORM module or virtual WORM in that the present invention offers WORM protection independent of the particular hardware and media.

A method of the present invention for use with sequential access media is shown in FIG. 3. At block 62 an external WORM module is established. At block 64, data blocks are received at the module. At block 66, block numbers are specified. At block 68, data is output from the module to write to the sequential access medium at specified block numbers. At block 70, the last specified block number is stored. At block 72, in a suitable implementation, future writing of data before the specified block is prevented. Because of the sequential nature of the media, only the last data block written is stored for each volume.

FIG. 4 illustrates a method of the present invention for use with random access storage media. At block 82, an external WORM module is established. At block 84, data blocks are received at the module. At block 86, block numbers are specified with the module. At block 88, data is output from the module to write to the random access medium at the specified block numbers. At block 90, all specified block numbers are stored. At block 92, future writing of data to the specified block numbers is prevented. For random access media, all specified block numbers are stored because of the random access nature of the media.

Figure 5:
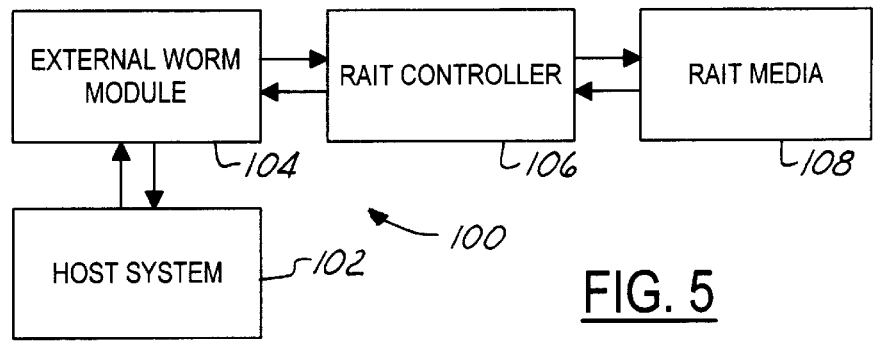
FIG. 5 is a system of the present invention utilizing a redundant array of inexpensive tapes.

FIG. 5 illustrates another implementation of the present invention. A system 100 includes a host system 102 and an external WORM module 104. External WORM module 104 communicates with a redundant array of inexpensive tapes (RAIT) controller 106 that in turn reads from and writes to RAIT media 108. Embodiments of the present invention are particularly useful in providing WORM protection to tape arrays because the present invention does not require physical locks and compatible drives. As such, WORM protection may be provided to an existing RAIT controller and RAIT media.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of storing data using write once read many (WORM) protection including using a hardware storage device to write data to a medium wherein data is organized on the medium by block numbers, the method further comprising:
   establishing a write once read many (WORM) module external to the hardware storage device;
   receiving a data block as an input to the module;
   specifying a block number with the module;
   outputting the data block from the module such that the data block is written to the medium at the specified block number;
   storing the specified block number such that the specified block number is accessible to the module; and
   preventing future writing of data to the specified block number using the module.

2. The method of claim 1 wherein establishing further comprises:
   establishing the write once read many (WORM) module as a hardware module external to the hardware storage device.

3. The method of claim 1 wherein establishing further comprises:
   establishing the write once read many (WORM) module as a software module external to the hardware storage device.

4. The method of claim 3 wherein establishing further comprises:
   establishing the software module as part of an application programming interface (API).

5. The method of claim 1 wherein the medium is a sequential access medium and wherein a plurality of data blocks is received, a plurality of block numbers is specified, the plurality of data blocks is output such that the plurality of data blocks is written to the medium at the plurality of specified block numbers, and a last specified block number of the plurality of specified block numbers is stored such that the last specified block number is accessible to the module so that the module may prevent future writing of data to the plurality of specified block numbers.

6. The method of claim 1 wherein the medium is a random access medium and wherein a plurality of data blocks is received, a plurality of block numbers is specified, the plurality of data blocks is output such that the plurality of data blocks is written to the medium at the plurality of specified block numbers, and the plurality of specified block numbers is stored such that the plurality of specified block numbers is accessible to the module so that the module may prevent future writing of data to the plurality of specified block numbers.

7. A system for storing data using write once read many (WORM) protection including using a hardware storage device to write data to a medium wherein data is organized on the medium by block numbers, the system comprising a write once read many (WORM) module external to the hardware storage device, the module being programmed to:
   receive a data block as an input to the module;
   specify a block number with the module;
   output the data block from the module such that the data block is written to the medium at the specified block number;
   store the specified block number such that the specified block number is accessible to the module; and
   prevent future writing of data to the specified block number.

8. The system of claim 7 wherein the write once read many (WORM) module is a hardware module external to the hardware storage device.

9. The system of claim 7 wherein the write once read many (WORM) module is a software module external to the hardware storage device.

10. The system of claim 9 wherein the software module as part of an application programming interface (API).

11. The system of claim 7 wherein the medium is a sequential access medium and wherein the module is programmed to receive a plurality of data blocks, specify a plurality of block numbers, output the plurality of data blocks such that the plurality of data blocks is written to the medium at the plurality of specified block numbers, and store a last specified block number of the plurality of specified block numbers such that the last specified block number is accessible to the module so that the module may prevent future writing of data to the plurality of specified block numbers.

12. The system of claim 7 wherein the medium is a random access medium and wherein the module is programmed to receive a plurality of data blocks, specify a plurality of block numbers, output the plurality of data blocks such that the plurality of data blocks is written to the medium at the plurality of specified block numbers, and store the plurality of specified block numbers such that the plurality of specified block numbers is accessible to the module so that the module may prevent future writing of data to the plurality of specified block numbers.

13. In combination with media including a redundant array of inexpensive tapes (RAIT), a system for storing data using write once read many (WORM) protection including using a hardware storage device to write data to the media wherein data is organized on the media by block numbers, the system comprising a write once read many (WORM) module external to the hardware storage device, the module being programmed to:

receive a data block as an input to the module;

specify a block number with the module;

output the data block from the module such that the data block is written to the media at the specified block number;

store the specified block number such that the specified block number is accessible to the module; and prevent future writing of data to the specified block number.

14. The combination of claim 13 wherein the write once read many (WORM) module is a hardware module external to the hardware storage device.

15. The combination of claim 13 wherein the write once read many (WORM) module is a software module external to the hardware storage device.

16. The combination of claim 15 wherein the software module as part of an application programming interface (API).

17. The combination of claim 13 wherein the module is programmed to receive a plurality of data blocks, specify a plurality of block numbers, output the plurality of data blocks such that the plurality of data blocks is written to the media at the plurality of specified block numbers, and store a last specified block number of the plurality of specified block numbers such that the last specified block number is accessible to the module so that the module may prevent future writing of data to the plurality of specified block numbers.

* * * * *